United States Patent
Yu et al.

(10) Patent No.: US 10,033,050 B2
(45) Date of Patent: Jul. 24, 2018

(54) KEY FOB BATTERY FRETTING CORROSION INHIBITOR

(71) Applicant: Continental Automotive Systems, Inc., Auburn Hills, MI (US)

(72) Inventors: Qiling Yu, Troy, MI (US); Raymond Laprairie, Sterling Heights, MI (US); Jennifer Carpino, Shelby Township, MI (US); John Burca, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 136 days.

(21) Appl. No.: 15/269,759

(22) Filed: Sep. 19, 2016

(65) Prior Publication Data

US 2018/0083293 A1 Mar. 22, 2018

(51) Int. Cl.
| | |
|---|---|
| H01M 2/04 | (2006.01) |
| H01M 6/50 | (2006.01) |
| H01M 2/02 | (2006.01) |
| H01M 2/10 | (2006.01) |
| G07C 9/00 | (2006.01) |

(52) U.S. Cl.
CPC .......... *H01M 6/50* (2013.01); *H01M 2/0222* (2013.01); *H01M 2/1044* (2013.01); *G07C 2009/00984* (2013.01); *H01M 2220/30* (2013.01)

(58) Field of Classification Search
CPC .... H01M 6/50; H01M 2/0222; H01M 2/1044; H01M 2220/30; G07C 2009/00984
See application file for complete search history.

(56) References Cited

U.S. PATENT DOCUMENTS

| | | | |
|---|---|---|---|
| 2003/0118893 A1* | 6/2003 | Takahashi | G04C 3/008 429/99 |
| 2004/0253867 A1* | 12/2004 | Matsumoto | H01H 1/5805 439/500 |
| 2014/0363716 A1 | 12/2014 | Nishida et al. | |

FOREIGN PATENT DOCUMENTS

| | | |
|---|---|---|
| DE | 102007022300 A1 | 11/2008 |
| EP | 1453121 A1 | 9/2004 |
| EP | 2808919 A1 | 12/2014 |

OTHER PUBLICATIONS

International Search Report and Written Opinion dated Oct. 25, 2017 from corresponding International Patent Application No. PCT/US2017/051374.

* cited by examiner

*Primary Examiner* — Cynthia K Walls

(57) ABSTRACT

Battery fretting or corrosion in a key fob is reduced or even eliminated by firmly holding the fob's battery against electrical contacts and holding the battery away from key fob components that are subject to deformation or deflection. Reduced battery movement relative to electrical contacts thus reduces or eliminates abrasion of the battery's electrically conductive surfaces.

11 Claims, 5 Drawing Sheets

KEY FOB BATTERY FRETTING CORROSION INHIBITOR

BACKGROUND

A "key fob" is considered herein to be a mobile, hand-held, battery-powered radio-frequency transmitter device that emits RF signals, which among other things enables access to a motor vehicle or building. As is well known, actuating one or more buttons a key fob causes a signal to be transmitted from the fob, which when received by a compatible receiver causes the vehicle's doors to unlock.

The transitive verb form of "fret" is defined by Miriam-Webster's 11$^{th}$ Collegiate Dictionary as meaning "to eat or gnaw into." "Corrosion" is a well-known process by which a material deteriorates, typically because of oxidation, which creates oxides that flake away from the base. The rust that forms on steel over time is a well-known oxidation. Oxidized metals are usually non-conductive.

Most key fobs are powered by flat, disc-shaped batteries. These prior art key fobs enclose the battery in a compartment with a cover and use electrical contacts, which unfortunately are configured such that deflection of the cover relative to the battery causes the battery to move in the compartment relative to the contacts. The battery movement abraids or "frets" the battery surfaces. It is well-known that such fretted surfaces corrode faster and, when such a mechanical damage, the corrosion electrically insulates the battery from the electrical contacts through which battery is supposed to flow to electronic devices in the fob. A key fob having a fretting corrosion inhibitor would improve key fob reliability and therefore be an improvement over the prior art.

DETAILED DESCRIPTION

Figure 1A:
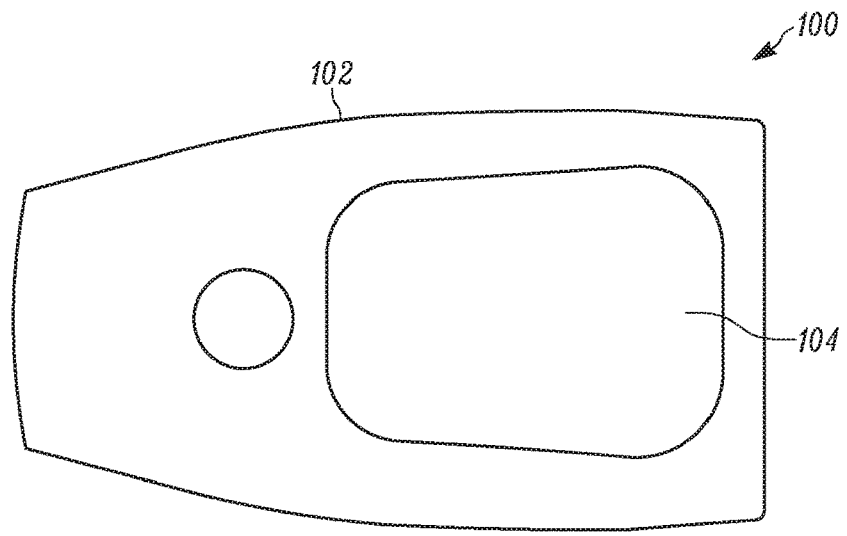
FIG. 1A is a top view of a key fob having a battery fretting corrosion inhibitor.

FIG. 1 is a top view of a key fob 100. FIG. 1A is a side view of the key fob 100. The key fob 100 comprises a housing 102 having a battery compartment 104 sized, shaped and arranged to accept a conventional disc-shaped battery 106.

Figure 1B:
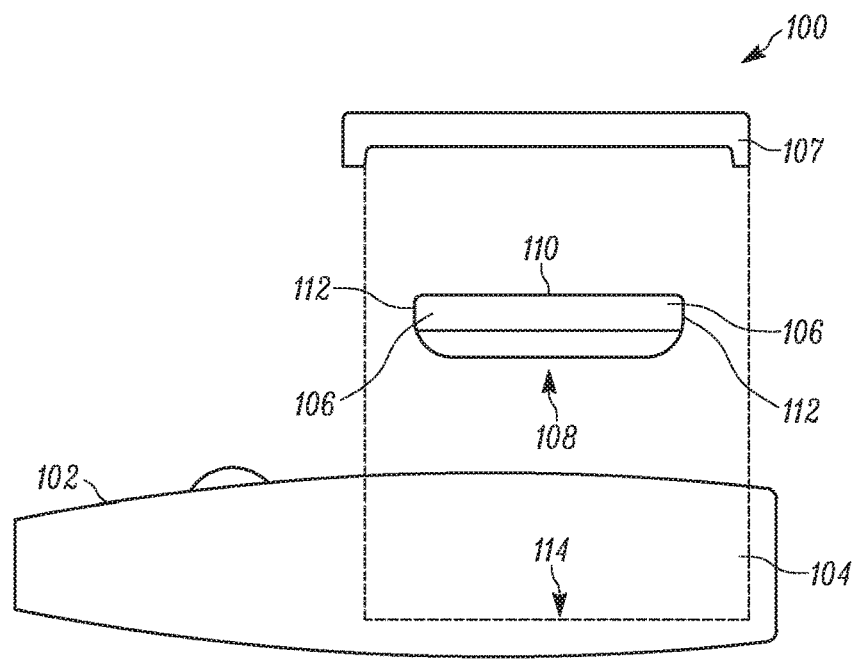
FIG. 1B is a side view of the key fob depicted in FIG. 1A, with the battery and battery cover removed.

As best seen in FIG. 1B, the battery 106 is disc-shaped having two opposing sides 108, 110. As shown in FIG. 1B, the bottom or first side 108 is also the negative terminal of the battery. The battery is bounded by a circumferential edge 112 which is electrically part of the second side 110 and the positive electrode for the battery.

The battery compartment 104 has a bottom surface 114 which supports and constrains the battery in combination with a battery retention post, described below.

Figure 2:
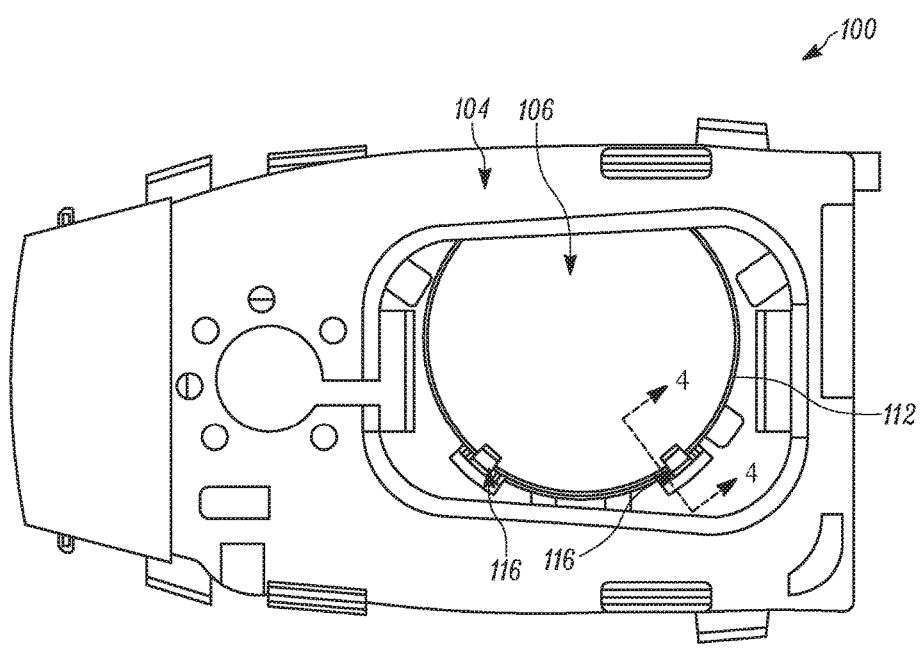
FIG. 2 is a top view of the key fob shown in FIG. 1A with the top half of the key fob housing removed.

In FIG. 2, which is a top view of the key fob 100, the battery 106 is "snapped" into the compartment 104 and held in place by two battery retention posts 116, the tops of which are visible in FIG. 2.

Figure 3:
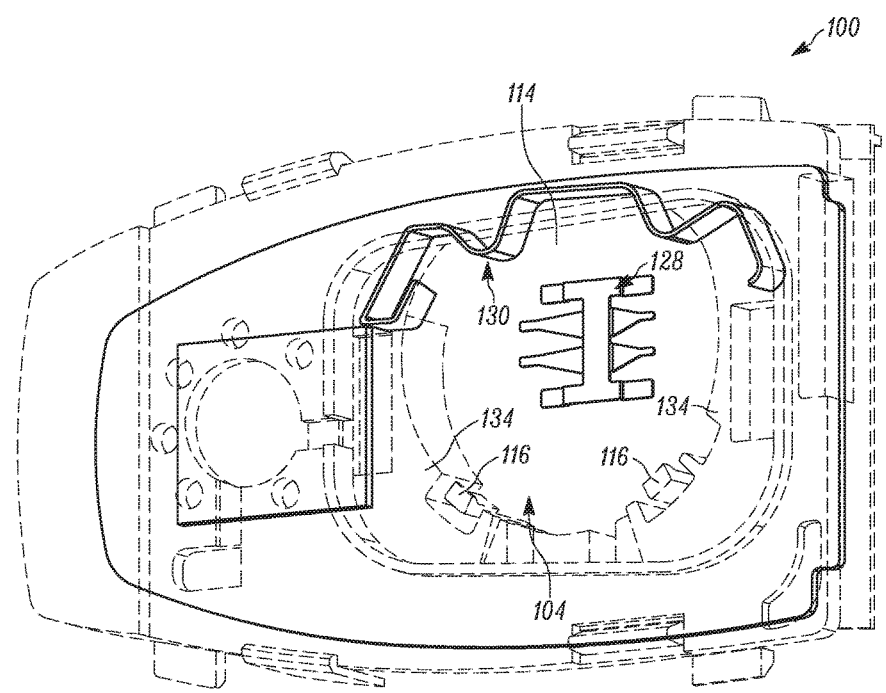
FIG. 3 is a perspective view of the key fob with the battery removed from its battery compartment, showing electrical contacts and battery retention posts.

Referring now to FIG. 3, which is a perspective view of the key fob, the battery 106 is removed from the compartment 104. A first spring-type electrode 128 can be seen attached to the bottom 114 of the battery compartment 104. The electrical contact spring 128 provides an electrical connection to a side of the battery 106 when it is placed into the compartment 104. The second electrical contact spring 130, which is configured to electrically engage the circumferential edge, provides a second electrical contact to the battery 106. The contact springs 128, 130 thus provide electrical connections between a battery 106 in the compartment 104 and electronic circuitry in the key fob 100. Such circuitry is not shown because it is not germane to this disclosure but nevertheless well known to those of ordinary skill in the art.

Two battery retention posts 116 can be seen in the figure. The posts 116 are located immediately adjacent to the battery compartment 104.

Figure 4:
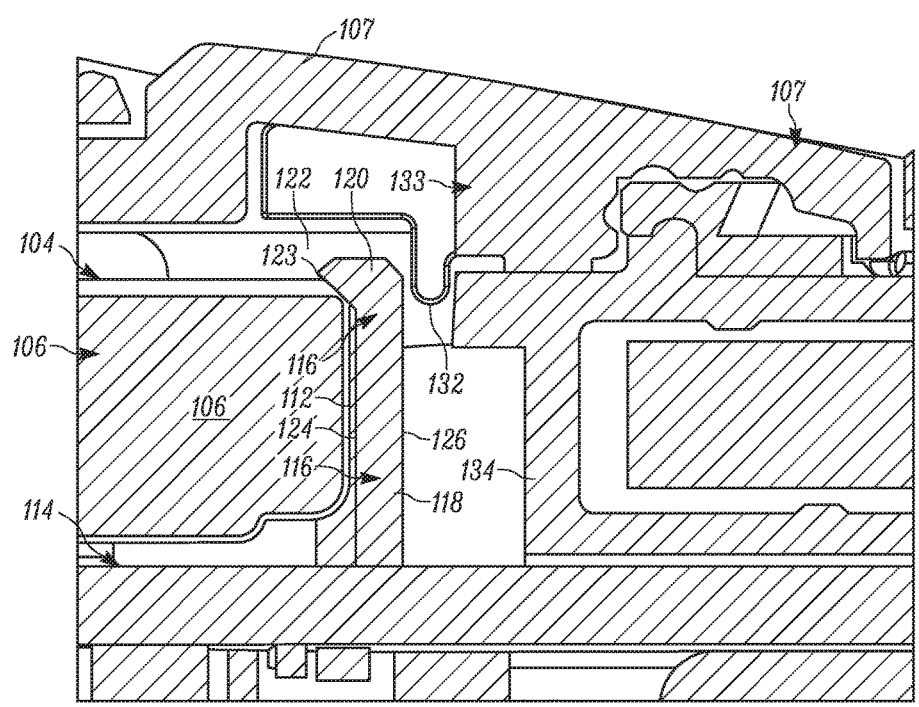
FIG. 4 is an isolated, sectional view of the key fob, taken through section lines 4-4, showing a battery retention post, locking cam and a stop pillar for the cover.

FIG. 4 is an isolated cross section of the key fob 100 taken through section lines 4-4, which are shown in FIG. 2. The battery retention posts 116 have a bottom or first end 118, which is "connected" to the bottom 114 of the compartment 104. The opposing top end 120 includes a substantially triangular-shaped projection 122, having an inclined lower surface 123.

The projection 122 and its inclined lower surface 123 are sized, shaped and arranged to extend over at least the circumferential edge of the battery and a small portion of the top surface.

The retention post 116 is preferably plastic, formed of the same material from which the housing 102 is made. The retention post 116 is also cantilevered from the bottom 114 of the battery compartment 104 and flexible. As best seen in both FIG. 3 and FIG. 4, it is also located immediately adjacent to the compartment such that the projection 122 is able to extend over the circumferential edge 112 of the battery 106 when the battery 106 is in the compartment 104.

The retention post 116 is considered herein as having a front surface or side 124 and a rear-facing or second side 126. In a preferred embodiment, the retention post 116 is urged over the battery 106 by a lip-like cam 132 that extends downwardly from the battery compartment cover 132 and at least partway into the compartment 104 from the bottom 133 of the cover 107. The cam 132 and the retention post 116 are thus considered to be cooperatively sized, shaped and arranged such that when the cover 107 is snapped in place over the battery compartment 104, the cam 132 is forced against the backside 126 of the retention post 116, causing the top end 120 of the post 116 to be urged or biased toward the battery 106 and battery compartment 104, responsive to attachment of the cover 107 on the key fob housing 102. The cam 132 thus "engages" the rear surface 126 of the battery retention post 116 and essentially "locks down" the battery 106 in the battery compartment 104 by virtue of the inclined surface 123 on the projection 122.

As used herein, the term, "pillar" refers to an upright support for a structure. The cover 107 for the battery compartment 104 is considered to be a structure.

Battery corrosion due to fretting or abrasion is inhibited by restricting movement of the cover 107 relative to the battery 106 and by, restricting movement of the battery 106 relative to electrical contacts 128, 130 in the compartment 104.

The battery compartment cover 107, which is essentially relatively flat or planar, is typically made from the same material from which the housing 102 is made, i.e., plastic. It is therefore flexible and capable of being deflected into the battery compartment 104 when the cover 107 is depressed or squeezed. Its vertical movement is limited by a pillar, referred to herein as a "stop pillar" 134.

It is well known that deflection of a simply supported beam due to its being loaded often causes the beam to move horizontally. The cover 107 can be considered to be a simply supported beam. By limiting its vertical movement using stop pillars 134, small amounts of horizontal movement of the cover 107 caused by its vertical deflection is therefore also restrained by the stop pillar 134. By holding the flexible cover 107 at a fixed separation distance above the battery 106 and battery compartment 104 using the stop pillars 134, and by holding the battery 104 against its electrical contacts using retention posts 116, virtually all mechanical abrasion or fretting of the battery's surfaces by electrical contacts 128 and 130 is eliminated, significantly improving the reliability of a key fob.

In the preferred embodiment, the stop pillar 134, like the retention post 116, is molded as part of the housing 102 and thus formed from the same plastic material.

For completeness, and referring again to FIG. 3, two battery retention posts 116 can be seen in the figure as being located away from each other on the periphery or circumference of the compartment. Both battery retention posts 116, are preferably located as close to the battery housing 104 to enable the projections 122 on each of them to extend over the circumferential edge 112 of the battery 106. The stop pillars 134 can be seen to also be distributed away from each other yet located adjacent to the battery compartment periphery.

Figure 5:
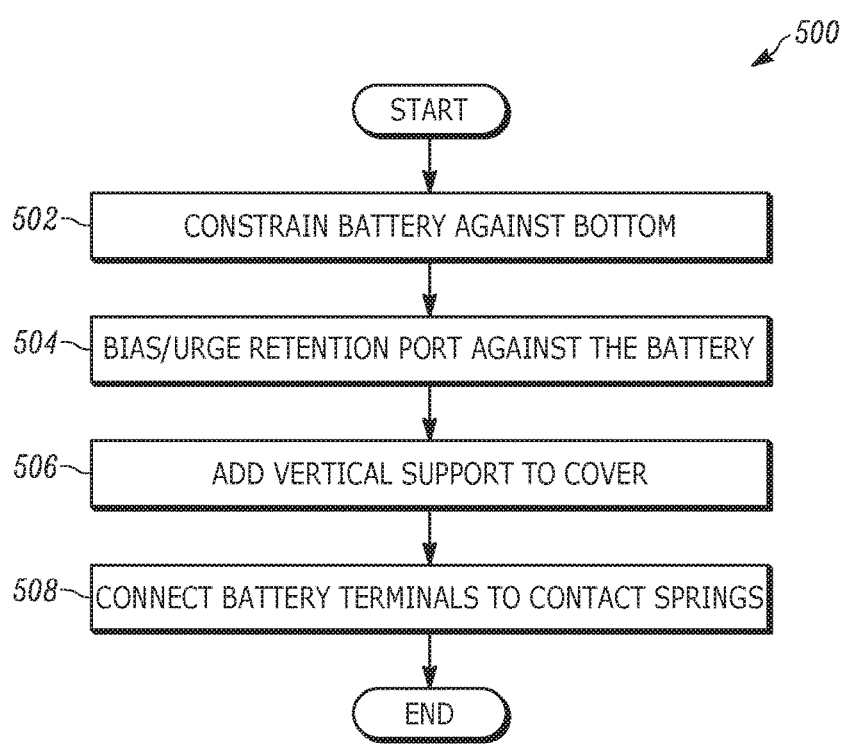
FIG. 5 is a flowchart depicting steps of a method for reducing fretting corrosion on a disc-shaped battery in a key fob.

Referring now to FIG. 5, there is shown a method 500 of reducing fretting corrosion of a disc-shaped battery 106 in a key fob 102 having a battery compartment 104 which is sized to receive such a battery. In a first step 502, movement of a disc-shaped battery is constrained in the battery compartment by one or more flexible retention posts that extend upwardly from a surface on which the battery is supported, i.e. the bottom of the battery compartment. The retention posts are of course configured to hold the battery down in the compartment and in contact with a spring-type electrical contact therein.

At a second step 504, the battery retention posts are urged against the battery, and as described above, preferably by way of a cam formed into the battery compartment cover. Placement of the cover over the compartment thus urges the retention post and the projections over and against the battery, further securing it in place.

At a third step 506, a vertical support can be added to the cover or to support the cover, limiting flexion of the cover downwardly into the compartment. Finally, at a fourth step 508, the battery is electrically connected to terminals provided in the compartment by which the battery electrodes are connected to electronic devices in the key fob itself.

Those of ordinary skill in the art should recognize that by properly mounting and securing a battery in a battery compartment in a key fob, abrasion between the battery and electrical contacts can be significantly reduced or eliminated. Eliminating such abrasion or fretting, mechanically eliminates corrosion between the battery electrodes and contacts that can eventually lead to a failure of the key fob.

The foregoing description is for purposes of illustration only. The true scope of the invention is set forth in the following claims.

What is claimed is:

1. A key fob comprising:
   a housing having a battery compartment sized and shaped to receive a disc-shaped battery having first and second opposing sides and a circumferential edge, a first side being a first electrode, the circumferential edge being a second electrode, the battery compartment also having a bottom, which is configured to support the battery;
   a first battery retention post located adjacent to the battery compartment and extending upwardly from the bottom of the battery compartment, the first battery retention post having a first end at the battery compartment bottom and an opposing second end, the second end comprising a projection, which is configured to extend over and engage at least the circumferential edge of the battery;
   a snap-on cover for the battery compartment; and
   a stop pillar extending upwardly from the bottom of the battery compartment, the stop pillar having a first end attached to the battery compartment bottom and a second end configured to engage the snap-on cover and limit deflection of the cover toward the battery compartment.

2. The key fob of claim 1, wherein the first battery retention post is flexible and cantilevered from the bottom of the battery compartment.

3. The key fob of claim 1, wherein the first battery retention post has a front surface facing the battery and an opposing rear surface, and wherein the snap-on cover comprises a first cam, which is sized, shaped and arranged to extend part way into the battery compartment, engage the rear surface of the first battery retention post and urge the first battery retention post toward the battery compartment responsive to attachment of the cover on the housing.

4. The key fob of claim 1, further comprising:
   a first electrical contact spring coupled to the bottom of the battery compartment and which is configured to electrically connect to a side of a battery in the battery compartment; and
   a second electrical contact spring configured to electrically connect to the circumferential edge of a battery in the battery compartment;
   wherein the battery retention post holds a battery in the battery compartment and in contact with the first and second electrical contact springs, wherein the stop pillar substantially eliminates mechanical contact between the battery and the snap-on cover, substantially eliminating abrasion of the battery by the first and second electrical contact springs.

5. The key fob of claim 4, wherein the first electrical contact spring is configured to electrically connect to the negative electrode of a battery in the battery compartment and wherein the second electrical contact spring is configured to electrically connect to the positive electrode of a battery in the battery compartment.

6. The key fob of claim 1, further comprising:
   a second battery retention post extending upwardly from the bottom of the battery compartment, the second battery retention post having a first end attached to the battery compartment bottom and an opposing second end, the second end comprising a projection, which is configured to extend over and engage at least the circumferential edge of the battery, the second battery retention post being located away from the first battery retention post along the circumferential edge; and wherein the first cam comprises a ridge, configured to extend at least part way around and into the battery compartment, engage the rear surfaces of battery retention posts and urge the battery retention posts toward the battery compartment responsive to attachment of the cover on the housing that extends from the cover.

7. The key fob of claim 1, further comprising:

a second battery retention post extending upwardly from the bottom of the battery compartment, the second battery retention post having a first end attached to the battery compartment bottom and an opposing second end, the second end comprising a projection, which is configured to extend over and engage at least the circumferential edge of the battery, the second battery retention post being located away from the first battery retention post along the circumferential edge; and a second cam, configured to extend at least part way into the battery compartment, engage the rear surfaces of the second battery retention post and urge the second battery retention post toward the battery compartment responsive to attachment of the cover on the housing that extends from the cover.

8. The key fob of claim 1, wherein the stop pillar is configured to reduce both horizontal and vertical movement of the cover, relative to a battery in the battery compartment.

9. A method for reducing fretting corrosion of a disc-shaped battery in a key fob having a battery compartment sized and shaped to receive a battery having first and second opposing sides and a circumferential edge, a first side of the battery being a first electrode, the circumferential edge being a second electrode, the battery compartment also having a bottom, which is configured to support the battery, the method comprising:

constraining a disc-shaped battery in the battery compartment by at least one flexible retention post that extends upwardly from the bottom of the battery compartment, and which is adjacent to the battery compartment, the flexible retention post having a first end attached to the battery compartment bottom and an opposing second end, the second end comprising a projection, which is configured to extend over and engage at least the circumferential edge of the battery;

urging the second end of the flexible retention post into mechanical engagement with the battery with a snap-on cover for the battery compartment, the snap on cover having a first cam, which is sized, shaped and arranged to extend part way into the battery compartment, engage a rear surface of the flexible retention post and urge first battery retention post toward the battery compartment responsive to attachment of the cover on the housing.

10. The method of claim 8, further comprising the step of reducing deflection of the snap on cover relative to the battery by a stop pillar that extends upwardly from the bottom of the battery compartment, the stop pillar having a first end attached to the battery compartment bottom and a second end configured to engage the snap-on cover and limit deflection of the cover toward the battery compartment.

11. The method of claim 8, further comprising:

connecting a first battery electrode to a first electrical contact spring that is coupled to the bottom of the battery compartment and which is configured to electrically connect to a side of the battery in the battery compartment; and connecting a second battery electrode to a second electrical contact spring that is configured to electrically connect to the circumferential edge of a battery in the battery compartment.

\* \* \* \* \*